April 1, 1941. V. V. KUNKEL 2,236,756
MECHANICAL MOVEMENT
Filed Oct. 26, 1940 3 Sheets-Sheet 2
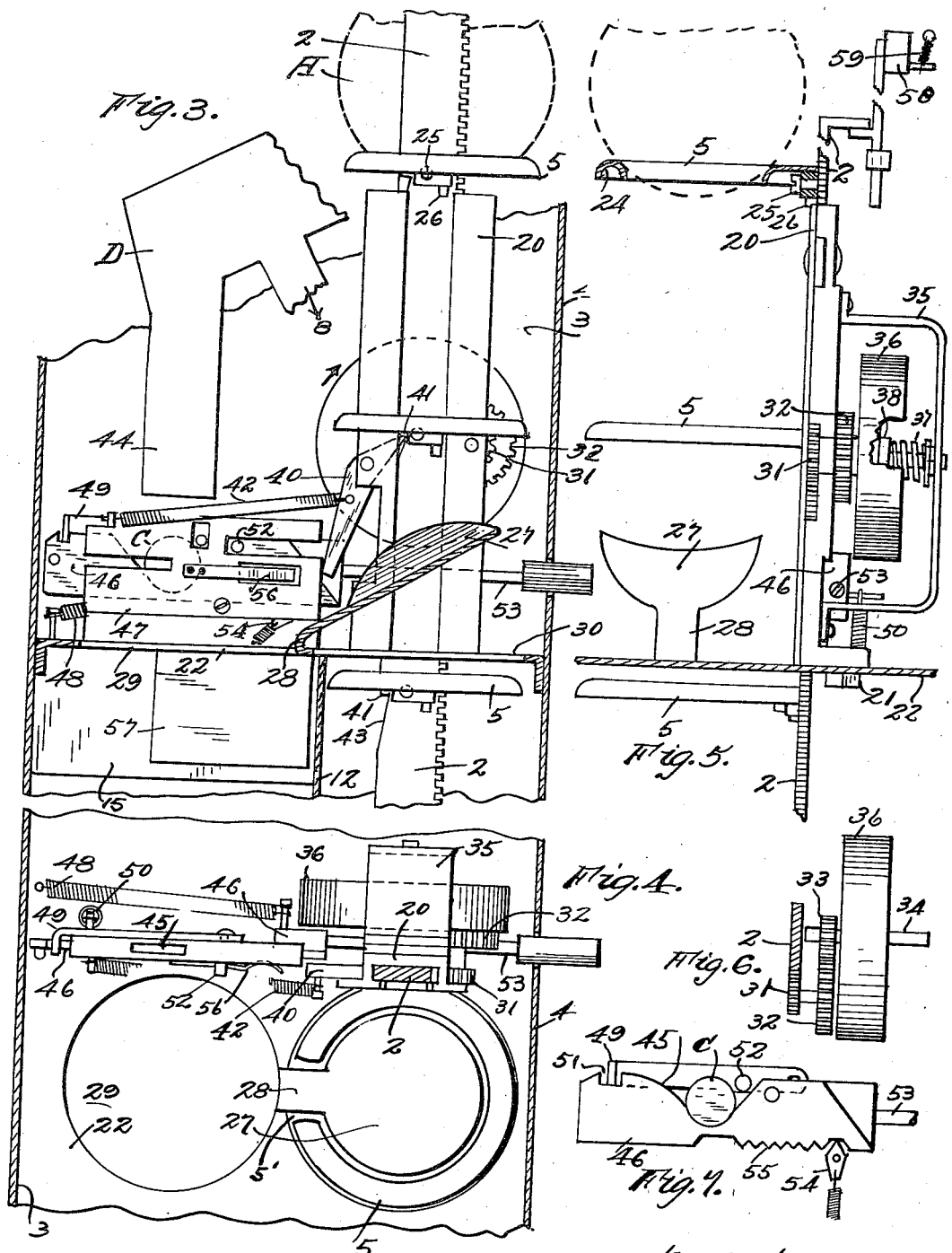
Inventor,
V. V. Kunkel;
By his atty,
Frederick E. Maynard

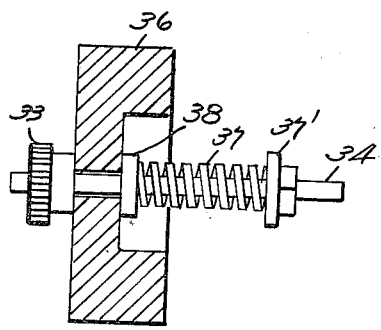
Fig. 8.
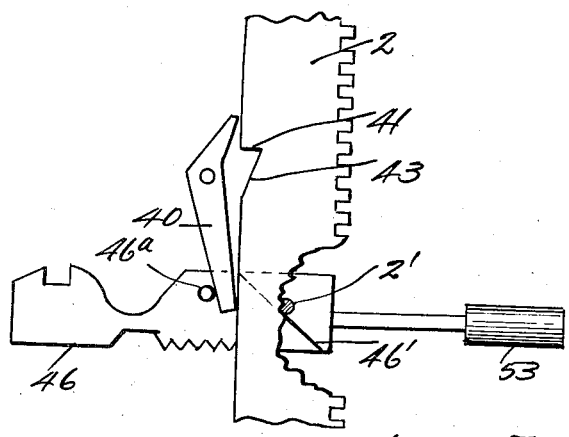
Fig. 9.
Fig. 10.

Patented Apr. 1, 1941

2,236,756

UNITED STATES PATENT OFFICE 2,236,756

MECHANICAL MOVEMENT

Victor V. Kunkel, Los Angeles, Calif.

Application October 26, 1940, Serial No. 363,040

19 Claims. (Cl. 214—127)

This invention is a mechanical movement and has to do with machinery, apparatus or mechanical adaptations which include a descendible device which it is desirable may be arrested during its downward movement and without appreciable rebound.

This application is a continuation-in-part of my application Serial No. 210,394, filed May 27, 1938.

Further, an object is to provide a gravity or otherwise motivated descendible device, for convenience here called the descender, which may not only be arrested suddenly in descent without apparent rebound, but in cases where the descender is gravity actuated its rate of descent is automatically controlled. In this connection it is an object to provide a control means for the descender which is itself motivated by the falling descender, and additionally to provide in one unit or assembly means to perform both the function of speed control or damping and of rebound elimination.

Carrying the invention, an object is to provide a mechanism in which a single element is utilized for the accomplishment of the dual function of damping of speed and negation of rebound.

In adapting the invention to a useful purpose, it is an object to provide a descender control for efficiently operating under various loads that may be imposed on the descender. In this aspect it is a further object to provide a motorless, self-acting and self-discharging machine whereby to successfully, successively dispense objects, articles, products of any desired nature from a storage and display compartment, and to provide a suitable control means, preferably including a device controlled by a selected, given coin or token which will constitute a proper connection to effectuate the dispensing operation of the machine; a noticeable object of the machine concept being to provide a highly practicable, reliable, capacious, low-cost structure of the utmost simplicity for the above designated purposes. Also, an object is to provide a machine of this type which is substantial, whose functional operation is initiated in a simple and direct manner, and in which is embodied a casing of small floor area and small depth from front to rear.

The invention consists in certain advancements in this art as set forth in the ensuing disclosure and having with the above, additional objects and advantages as hereinafter developed, and whose construction, combination, and details of means, and the manner of operation will be made manifest in the description of the herewith illustrated embodiment; it being understood that modifications, variations and adaptations may be resorted to within the scope, principle and spirit of the invention as it is more directly claimed hereinbelow. It is understood that the functional use of the mechanical movement of this invention in any other art than that herein exhibited is deemed to be within the adaptation and scope thereof.

Figure 3 is a side elevation of the mechanical movement in its normal rest position; part of the casing being a vertical section from front to rear.

Figure 4 is a top plan of the movement.

Figure 5 is a frontal elevation of the movement of Fig. 3.

Figure 6 is a detail plan of the gear train of the speed and rebound control unit.

Figure 7 is side elevation of the coin or connector controlled stock discharging, descender release device.

Figure 8 is a sectional elevation of the brake clutch.

Figure 9 is an elevation, partly sectioned, of the descender fall stop in effective position, and Figure 10 is a top plan thereof and showing the release lever in section.

Figures 1, 2:
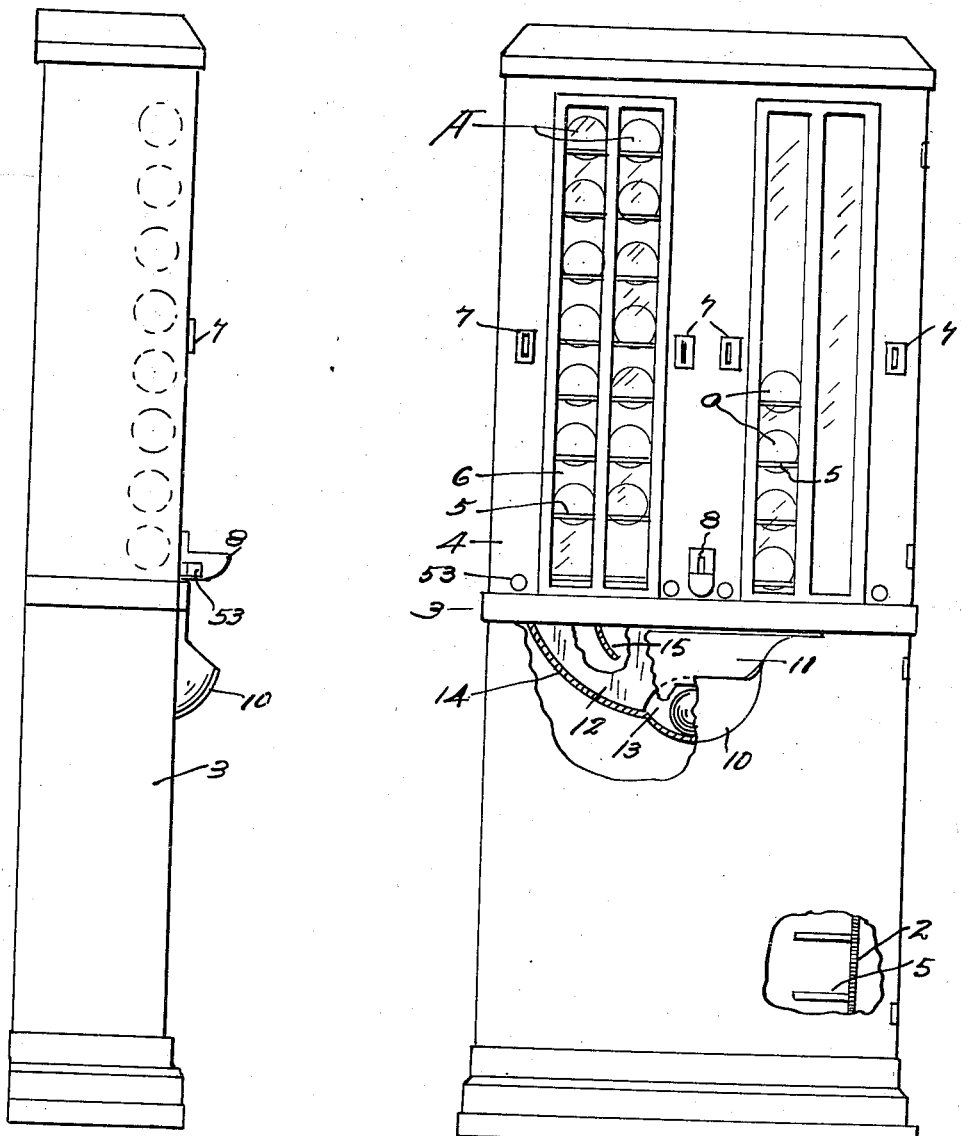
Figure 1 is a broken-away, front elevation of the casing of the machine; showing two full descender racks, a half-discharged rack and a part of a discharged, lowered or concealed rack below its relative, now empty, show window.
Figure 2 is a side elevation of the machine.

In its illustrated adaptation the movement is incorporated in a machine designed and constructed for successively dispensing pieces of fruit such as whole apples, oranges, grapefruit, pears, avocados, pomegranates, or various other articles of commerce as may be conveniently marketed from token controlled machines.

Indeed the invention has a great range of use in self-service stores where the installation of the desired stock in machines of this kind would greatly reduce loss by theft, would eliminate requirements for cashiers other than for the purpose of making change or for selling suitable tokens for use in the machines, and would expedite the service of patrons.

The machine is designed to contain in a plurality of descenders 2, Fig. 1, a variety of species of apples A, and oranges O, and pears, for instance, if available and in season, all at the same time in the one machine so that the patron may have his or her choice of the kind of fruit.

In order to make the machine acceptable for installation in narrow halls and lobbies and railway or boat stations the present machine has a plurality of descenders 2 with the relative control means all arranged side by side in a vertical plane so as to occupy as narrow a space on a wall or other situation as possible. In carrying out this feature the machine involves a simple shallow casing 3 with a suitable frontal door 4 to facilitate loading of the several racks 5 of each descender 2. The upper front of the machine is provided with a suitable window system with panes 6 for ready view of the dispensable stock with which the racks are supplied, and the lower front of the machine forms a closure to conceal the emptied, lower racks of the several descenders as they pass below the windows.

At a suitable height there is provided a token slot-mouth 7 for each rack system and also there is provided a rejected coin or slug pocket 8 accessible to the depositor.

Any articles dispensed from the racks will be passed to a frontal, centrally located basin 10 having a back wall 11 spaced forwardly of a baffle plate 12 having a bottom hole 13 leading to the basin. Fruit or other vended articles passing from the racks 5 fall a short distance to a trough 14 back of the baffle 12 and where needed a short fall-break 15 is placed to check the drop of the unloaded fruit to the trough 14, all as seen in Fig. 1.

The mechanical movement

Each descender 2 consists of an elongate, stiff, preferably flat rack-toothed bar vertically, slidably guided in a rigidly mounted column 20 fastened as by bolts 21 to a shelf or projection 22 suitably fixed in the casing 3 and closing off the window compartment from the lower, closure compartment back of the front door.

There is a like control mechanism for each descender bar 2 and the following description of one will suffice for all. The bar 2 has projecting normal to one side thereof a vertical row of racks or article supports 5 each of which consists of a light but substantial ring 24 having a supporting pivot 25 fixed and normal to the bar 2 and permitting tilting of the rack ring from a horizontal position into a vertical plane along and normal to the flat bar 2 for compact packing of the dismounted descender as a unit. The ring 24 is hung off center on its pivot 25 so as to normally rest in the illustrated position when the descender is installed. A stop lug 26 is fixed on the bar 2 in a position to stop and hold the ring 24 transverse to the vertical bar 2 and help carry the imposed load of stock or fruit as placed on each rack ring; these rings being suitably vertically spaced in their row up the bar or descender 2.

The rear side of each rack ring 5 is shown as having an opening 5' to provide for the ready downward movement of the successive rings 5 past a rearwardly and downwardly inclined, unloading chute or disc 27 joined by a reduced shank 28 to the platform 22, Figs. 3 and 4; the opening 5' of each rack ring passing the shank as the ring descends and as the piece of fruit is deposited on the chute disc 27 to deflect it to a throat hole 29 in the platform 22 and thence to the trough 14 and its basin 10. The platform 22 has also an escape hole 30, Fig. 3, for the row of rack rings 5 and the chute disc 27 is fixed concentrically of the hole 30 and of the hole in the rack ring, Fig. 4.

The front, toothed edge of the descender bar 2 is in constant mesh with a small pinion 31, Fig. 6, which is fixed to a larger gear 32 and this meshes with a smaller pinion 33 fixed on a short shaft 34 whose ends are mounted in the column 20 and an outset bracket 35, whereby to effect a relatively greater speed of rotation of the shaft 34 as to the rate of fall of the rack bar 2, and secure the positive drive of the shaft 34 by the bar without other motivating means and the bar or descender itself being, preferably, only gravity actuated.

Unless under some sort of a control the falling speed of the descender would be very objectionable in an attempt to arrest the descender in successive stages for the individual discharge of the pieces or articles. Also it is essential that a means be provided to eliminate objectionable rebound of the descending article carrier or descender. A feature of the present invention is the provision of a single mechanical element having the dual capacity of first acting to control the rate of falling speed of the descender and then to eliminate rebound thereof when the descender is instantly arrested in falling movement.

This provision includes a momentum rotor or wheel 36 which is rotatively, that is loosely, mounted on the shaft 34 and is under constant engagement with a suitable rotational re-actor here in the form of an expansion spring 37, or its functional equivalent, pressing a friction or clutch washer 38 against the near surface, Fig. 5, of the wheel 36 and pressing this wheel endwise on the shaft 34 to an abutting part such as the near hub of the pinion 33; the outer end of the spring seating on a washer 37', Fig. 5, on the shaft 34.

The spring 37 thus sets up a desired friction clutch action to cause the wheel to turn with the shaft 34 as this is rotated by the gear train 31—32—33 motivated by the effective descender bar 2.

When the load of the descender bar 2 is released to become effective on the gear train and the wheel 36, as presently described, the inert wheel at once sets up a damping action to impose such a reaction on the descender as to cause it to fall at any desired speed, loaded or empty. While it is true that the speed of the wheel 36 will gradually accelerate if the fall of the descender is uninterrupted, it will be seen that since the descender is arrested in successive steps to individually unload its vertically spaced articles the movement of the descender from its topmost position to the lowermost, empty position will be in steps each of substantially the same rate of speed, due to the constant inertia load of the braking wheel 36, irrespective of the degree of reaction of the brake-effect clutch device as between the wheel 36 and the shaft 34 on which it is turnably mounted under control of the clutch spring 37.

If the descender is suddenly arrested in its descent as by means of a stop latch 40, Figs. 3-4, slipping into engagement with one of the evenly spaced stop shoulders 41 provided along the rear edge of the descender bar 2, then there is a normal or natural tendency of the descender to rebound. Since the momentum wheel 36 has been set in rotary motion through the clutch 37—38 by the descender driven gear train, the wheel has acquired a certain degree of kinetic energy and by causing the wheel to turn in the proper direction (clockwise in Fig. 3) this energy is employed as torque through the brake-effect clutch device to the now arrested shaft 34 and the gear train back to the toothed rack bar 2 to apply thereto a downward thrust sufficiently higher than the recoil or rebounding tendency of the descender or bar 2 to neutralize any vertical reverse or jump motion. Therefore, the momentum wheel 36 is heavy enough to kill the rebound of the loaded articles and of the descender itself, by instant application of the kinetic energy in the wheel to the arrested descender, for one function, and in another function by its inertia the wheel dampens the falling speed of the released descender.

The descender bar itself is designed to automatically control the intermittent stopping thereof by its associated stop latch 40; this being constantly pressed by a spring 42 against a cam edge of the descender bar 2 which is provided with relief notches 43 subjacent each stop shoulder 41 therealong so that when the latch 40 rides into each notch 43, under spring action, the latch will be in the path of the next superadjacent shoulder to stop bar descent.

In the present disclosure of the invention the machine is rigged for release of the stop device or latch 40 from time to time by the insertion of a proper and machine selected and passed coin or other given piece C to serve as a connector in a releasing mechanism for the latch 40. The given coin is dropped into the desired coin mouth 7 and passes to a suitable and conventional coin detector D, Fig. 3, from which a rejected piece, coin or token will be diverted to the return pocket 8, Fig. 1. The selected or proper coin will pass by a guide 44 to the open mouth 45 of a bolt 46 which is reciprocative in a housing 47 fixed in the casing, and which bolt is normally retracted to an idle or ready position by a spring 48 and in which position it is automatically locked by suitable means, as a hook 49 under action of a spring 50 drawing the nib of the hook into a notch 51 in the bolt 46.

The proper coin C, Fig. 7, lodges in the bolt mouth 45 in rear of a dog or pin 52 of the hook 49 and, if now, the bolt 46 is pulled forwardly in the housing 47 by a manual stem 53 extended to the front of the casing 3, the hook 49 will be elevated by the coin acting as a connector against the dog 52 and the unlocked bolt 46 can be pulled forwardly to bring pin 46a fixed on it against the leg of the latch 40 whose upper end or nose will be forced backwardly clear of the imposed shoulder 41 of the bar 2, and the freed descender will at once start its fall, under retardation by the momentum wheel 36, until the next higher of a series of lugs 2' projecting from one face of the bar 2 engages the now interposed, inclined end or cam face 46' of the bolt 46 and the descender is stopped until the stem 53 is released and the bolt is pulled back by its spring 48 with the result that the descender 2 may resume its falling motion to a degree to discharge an article onto the chute 27 and then again be arrested by the automatic latch 40 engaging the next upper shoulder 41, Fig. 1.

A double action, spring-controlled tumbler 54 acts on a complementary tooth rack 55 on the bottom of the bolt 64 to control and prevent less than a full stroke of the bolt in either direction.

When the bolt 46 reaches its full forward stroke to release the latch 40 from the descender 2 a spring 56 on the housing 47 acts to eject the coin C from the mouth of the bolt so that the utilized coin may fall into a money box 57. When the bolt is retracted by its spring 48 the latching hook 49 again snaps into the bolt notch 51 to lock the bolt, now again in a position to receive another coin.

When the racks of each descender 2 are all unloaded a barrier means 58 here shown as engageable by the upper part of a related descender 2 will be brought into closing position over the respective coin slot mouth 7 to prevent insertion of another coin. The barrier is normally held in open position by a spring 59.

What is claimed is:

1. In a mechanical movement, a descender, means to stop its descent instantly, and a rotary, over-running, rebound check for eliminating bounce of the arrested descender and including a brake-controlled, descender-motivated rotor having a controlled running function after the descender is stopped.

2. In a mechanical movement, a travelling device, means to stop motion thereof instantly, and a momentum instrument including a braked, over-running wheel for absorption of recoil reaction of the stopped device to eliminate its reverse rebound and being motivated thereby and the kinetic energy being applied to the said device to prevent its recoil.

3. In a mechanical movement, a travelling device, and a braked, momentum instrument actuated thereby and which is operative to dampen the speed of the device and to absorb recoil reaction when the device is arrested suddenly; said instrument including a rotary member stored with energy by said device and which member spends said energy in holding said device against a reverse motion after arrest of the device.

4. In a mechanical movement, a travelling device, means to instantly stop travel thereof in one direction and being under control of said device, and means including a momentum instrument driven by said device to store energy and for absorbing recoil reaction of the arrested device and comprising an over-running rotor acceleratedly driven by the said device.

5. A machine of the class set forth including a travelling device, means for repeatedly, instantly stopping travel of the device in one direction, and retardation means motivated by said device and constructed to absorb rebound reaction of the arrested device and including a speed accelerated, braked momentum wheel.

6. A machine of the class described including a travelling device, a releasable stop means for repeatedly instantly arresting said device, means operative at will to effectively release the stop means to free said device, and means driven by said device and including an over-running rotor for its speed retardation and whereby recoil of the arrested device is eliminated.

7. A descendible device which is combined, drives and whose falling speed is retarded by a braked momentum means; the device and said means being intergeared for motivation of said means by said device.

8. Mechanism as in claim 7, and in which there is provision for absorption of recoil reaction of the device by said means if and when the device is suddenly arrested.

9. A machine of the class described including a travelling device, a releasable stop means normally holding the device against travel in one direction, means operative to effect release of the device from the stop means, and retarding means motivated by said device and stopping recoil thereof when arrested by the stop means and including a braked, over-running rotor.

10. A machine of the class described including a gravitating device, stop means normally holding the device against descent and being controlled thereby for repeated action to effect step by step descent of the device, means for effecting release of the device from the stop means for such step action, and means including a braked, over-running rotor propellantly combined with the device for retarding rate of descent of the device and eliminating its recoil on arrest.

11. A machine of the class described including a travelling device, a stop means for holding the device against motion in one direction, means for effecting action of the stopping means in given steps along the travelling device, means to effect release of the device from the stopping means, and speed retardation and shock absorbing means combined with the said device and including a braked, over-running rotor and accelerating drive means for the rotor actuated by the said device and the rotor operative by over-run as to said accelerating means to apply stored energy with a holding effect on said device.

12. A machine as in claim 11, and in which the retardation means includes a brake instrument constantly effective to resist rotation of the rotor as to the arrested device.

13. A mechanical movement having, in combination, a travelling structure, a momentum rotor, means driven by the said structure to rotate the rotor and providing for relative over-running action of the rotor when the structure is arrested, means to arrest the travelling structure, and said driven means including an acceleration and deceleration clutch means operative on the rotor.

14. A mechanical movement having, in combination, a gravity actuated structure, and means including a momentum wheel operated by said structure to convert the force of gravity into kinetic energy, and a clutch engaging the wheel and acting to brake a reverse motion of the said structure.

15. The movement of claim 14, and said means including a pinion driven by the said structure and a gear train operated by the pinion and whereby the speed of rotation of the pinion is accelerated.

16. The movement of claim 14, and said wheel acting as a speed restrainer of and providing for the application of said stored energy to the said structure whereby to effect a control of the structure.

17. The movement of claim 14, and the said clutch having constant, effective engagement with the wheel for control of acceleration of said structure in one direction and for stopping a reverse recoil thereof.

18. The movement of claim 14, and said means including a pinion driving the clutch and thereby said wheel, and a gear train including a second pinion, driven by said structure, and gears to increase speed of rotation of the clutch pinion and the wheel as to rotation of the second pinion during descent of the structure whereby to impose work on the structure and decrease its speed and, conversely, when the structure is arrested, to place the shock of its rebound onto the motivated wheel by the said clutch.

19. The movement of claim 14, and said clutch operative initially on said wheel to retard acceleration of said structure and later to decelerate motion of said wheel and thereby check recoil of the actuating structure.

VICTOR V. KUNKEL.